United States Patent [19]
Matsui

[11] Patent Number: 5,161,058
[45] Date of Patent: Nov. 3, 1992

[54] FOCUSING SCREEN

[75] Inventor: Hiroshi Matsui, Kanagawa, Japan

[73] Assignee: Canon Kabushiki Kaisha, Tokyo, Japan

[21] Appl. No.: 713,611

[22] Filed: Jun. 11, 1991

Related U.S. Application Data

[63] Continuation of Ser. No. 555,808, Jul. 23, 1990, abandoned, which is a continuation of Ser. No. 359,487, May 31, 1989, abandoned.

[30] Foreign Application Priority Data

May 31, 1988 [JP] Japan .................. 63-134126
May 31, 1988 [JP] Japan .................. 63-134127

[51] Int. Cl.$^5$ .................. G03B 13/24; G02B 5/18
[52] U.S. Cl. .................. 359/574; 359/569; 354/200
[58] Field of Search ........... 350/162.11, 162.2, 162.23, 350/162.24, 431, , 167, 127, 168; 354/200; 359/558, 569, 572, 573, 615, 619, 454, 707, 625, 626, 628, 574

[56] References Cited

U.S. PATENT DOCUMENTS

| | | | |
|---|---|---|---|
| 4,336,989 | 6/1982 | Matsumura et al. | 354/200 |
| 4,421,398 | 12/1983 | Suzuki et al. | 354/200 |
| 4,427,265 | 1/1984 | Suzuki et al. | 350/167 |
| 4,519,686 | 5/1985 | Seki et al. | 350/127 X |
| 4,598,977 | 7/1986 | Kobayashi | 350/162.2 |
| 4,697,878 | 10/1987 | Kimura | 350/162.11 |
| 4,982,214 | 1/1991 | Matsui | 350/127 X |

FOREIGN PATENT DOCUMENTS

| | | | |
|---|---|---|---|
| 55-9568(A) | 1/1980 | Japan | 354/200 |
| 55-70827(A) | 5/1980 | Japan | 354/200 |
| 56-47539 | 4/1981 | Japan | |
| 60-53841 | 3/1985 | Japan | |

Primary Examiner—Bruce Y. Arnold
Assistant Examiner—David R. Parsons
Attorney, Agent, or Firm—Fitzpatrick, Cella, Harper & Scinto

[57] ABSTRACT

A phase type focusing screen has a plurality of minute patterns of a given shape formed by protrudent and/or recessed parts and allocated on a surface of an optically transparent base plate. Assuming that a stepped level difference between a top face of the protrudent part or a bottom face of the recessed part and the surface of the base plate is d, a refractive index of a material of the base plate is n and the shortest wave length within a working wave length region is λ, the following condition is satisfied:

$$d \geq 1.5\lambda/(n-1)$$

10 Claims, 11 Drawing Sheets

FOCUSING SCREEN

This application is a continuation of application Ser. No. 07/555,808 filed Jul. 23, 1990, which is a continuation of Ser. No. 07/359,487, filed May 31, 1989, both now abandoned.

BACKGROUND OF THE INVENTION

1. Field of the Invention

This invention relates to a phase type focusing screen and more particularly to a phase type focusing screen having a diffusing characteristic highly suited for forming an object's image in a photographic camera, a video camera or the like.

2. Description of the Related Art

Phase type focusing screens of varied kinds have hereto been proposed. They have a plurality of minute patterns of a given shape formed by protrudent or recessed parts provided on the surface of a transparent base plate. They are thus arranged to have a desired diffusing characteristic which imparts phase differences areawise to light fluxes passing therethrough.

Figure 10A:
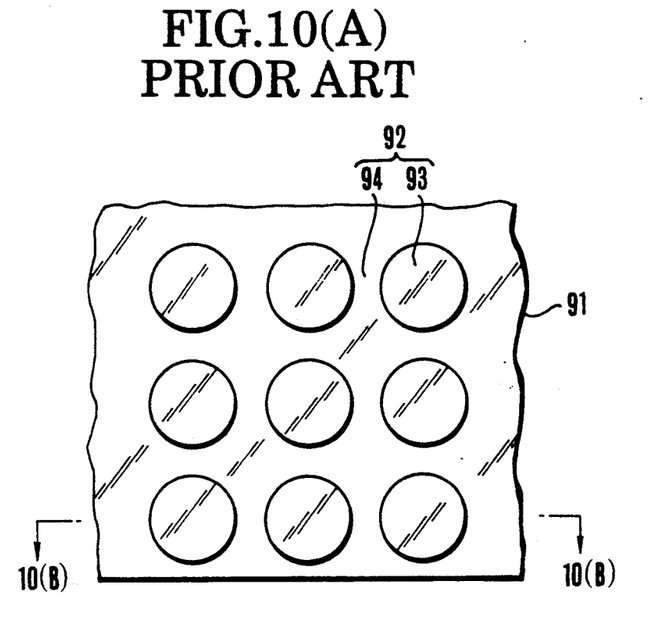
FIGS. 10(A), 10(B), 11(A), 11(B), 12(A) and 12(B) are plan and sectional views showing the conventional phase type focusing screens.
Figure 10B:
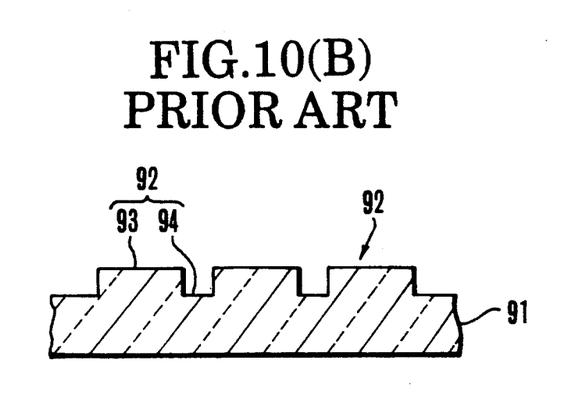

For example, Japanese Laid-Open Patent Application, No. SHO 62-269127 has disclosed a phase type optical device which has minute patterns regularly and repeatedly arranged on the surface of a base plate 91 with each pattern formed by a rise 93 and a recess 94 as shown in FIGS. 10(A) and 10(B) of the accompanying drawings. However, the periodic array of the minute patterns tends to cause a chromatic blur in the image obtained by a photo-taking system as it brings about a strong influence of diffraction of light.

Figure 11A:
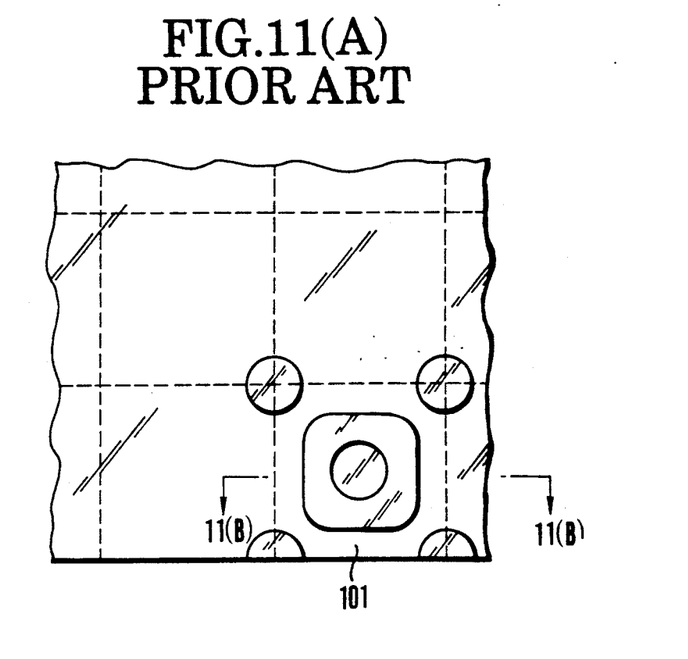
Figure 11B:
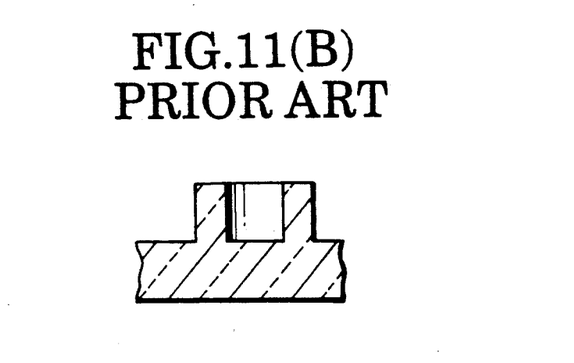
Figure 12A:
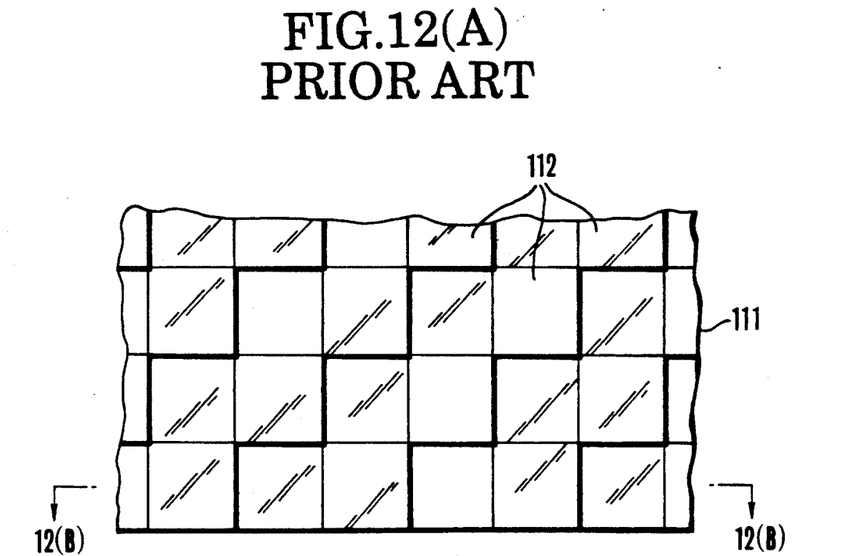
Figure 12B:
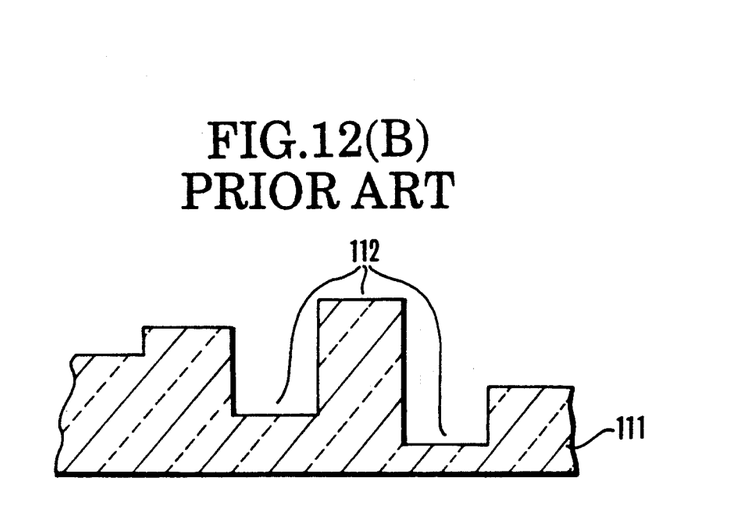

FIGS. 11(A) and 11(B) show another known focusing screen which has a stepped level difference equal to a distance between the base plate and a raised surface of a focusing screen that would produce a phase difference of $\pi$ radians between light traversing the raised region and light traversing the unraised region of the base plate. However, this focusing screen gives a desired diffusing characteristic only for one wavelength within the visible region. FIG. 11(B) is a sectional view of FIG. 11(A). Further, broken lines in FIG. 11(A) represent virtual lines. Each square region 101 defined by these vertical lines represents a unit region. The unit regions 101 are regularly arranged.

Japanese Patent Publication No. SHO 56-47539 has also disclosed a phase type optical system which is provided with a transparent optical element including a plurality of minute optically uneven bodies. In the case of this phase type optical system, a product of a difference between the refractive index of the uneven body (medium) and the refractive index of the outside thereof and the dimension of the uneven body is smaller than one wave length. A desired diffusing characteristic is obtained by arranging each of the uneven bodies to measure 10 μm or less in the direction perpendicular to the incident direction of light. However, this phase type optical system is very difficult to manufacture as the uneven bodies must have an extremely thin thickness. In addition to this problem, the desired diffusing characteristic is obtainable only for one wave length. For other wave lengths, the diffusing characteristic varies.

Japanese Patent Publication No. SHO 60-53841 has disclosed a diffusing plate having a random phasic level array. This diffusing plate is arranged to allot, to each of regions obtained by dividing the surface of a base plate 111 into a checkered state consisting of M rows X N columns, one of a plurality of phase levels, which can be expressed as follows:

$$0, \pi/K, 2\pi/K, 3\pi/K, \ldots$$

(wherein K is at least 3)

In the case of this phase type optical device, a phase difference 0 to $2\pi$ is equally divided into six equal portions or thereabout. Therefore, the degree of accuracy required for stepped difference control becomes severe.

SUMMARY OF THE INVENTION

It is a general object of this invention to provide a phase type focusing screen which is highly suited for a photographic camera or a video camera or the like and gives a desired diffusing characteristic over a wide wave length range by suppressing the diffraction of incident light with a plurality of minute patterns composed of rises and recesses formed on an optically transparent base plate in a given shape.

It is a more specific object of the invention to provide a phase type focusing screen which has a good diffusing characteristic with a minimal degree of chrominance blur by eliminating diffraction light at least for two wave lengths within a visible wave length range (from 300 to 700 nm in the case of this embodiment).

The above and further objects and features of the invention will become apparent from the following detailed description of embodiments thereof taken in connection with the accompanying drawings.

DETAILED DESCRIPTION OF THE PREFERRED EMBODIMENTS

Figure 1A:
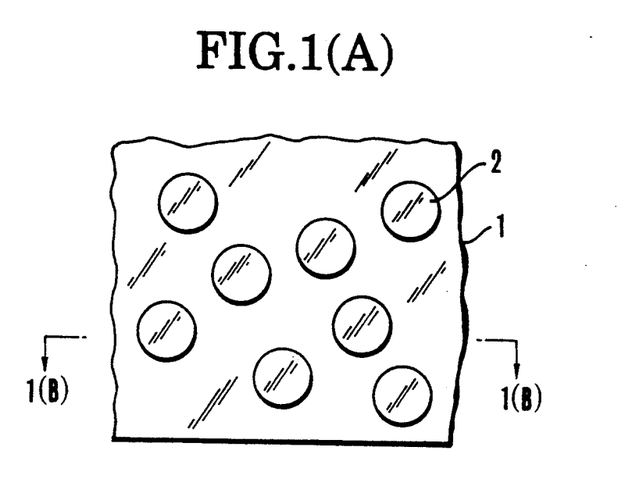
FIGS. 1(A) and 1(B) are a plan view and a sectional view showing a first embodiment of the invention.
Figure 1B:
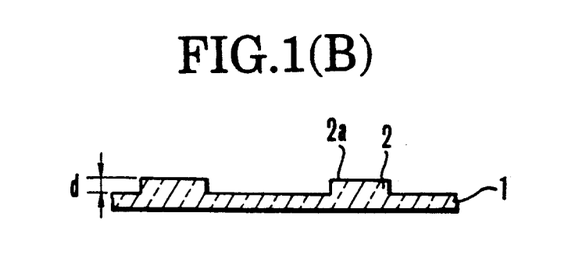

FIGS. 1(A) and 1(B) are a plan view and a sectional view, respectively, showing a first embodiment of the invention.

Referring to FIGS. 1(A) and 1(B), a reference numeral 1 denotes an optically transparent base plate. A numeral 2 denotes minute patterns which are formed by rises made of the same material as the base plate 1.

In the case of the first embodiment, a plurality of the circular minute patterns 2 of rises or protrudent parts are formed and irregularly arranged on the surface of the base plate 1. A light flux which passes through each protrudent part 2 is arranged to have a given phase difference from the phase of a light flux not passing through the protrudent part. In other words, a scattered state of light is brought about areawise by imparting a given phase difference to the light fluxes to obtain a desired diffusing characteristic.

Assuming that the degree of a stepped level difference between the top face 2a of each protrudent part and the surface of the base plate 1 is d; the shortest wavelength obtainable from within a working wavelength region of light incident on the focusing screen is λ with the working wavelength region assumed to be from 300 to 700 nm; and the refractive index of the material of the base plate 1 and the protrudent parts is n, this specific embodiment is arranged to satisfy the following condition:

$$d \geq 1.5\lambda/(n-1) \qquad (1)$$

In order to obtain the desired diffusing characteristic by controlling the minute patterns of the protrudent parts when the incident light of the wave length λ comes to the focusing screen, the step difference value d and the refractive index n must be set at such values that satisfy the following formula:

$$(n-1)d = \left(\frac{2l-1}{2}\right)\lambda \; (l = 2, 3, 4, \ldots 5,) \qquad (2)$$

In the case of the first embodiment, the diameter of each circular minute pattern 2 is arranged to be within a range from 1 to 7 μm. The desired diffusing characteristic can be easily obtained by this arrangement.

Next, the base plate 1 and the protrudent parts 2 are made of an acrylic resin material $n_d$(the refractive index relative to the d line (=587 μm))=1.49171 and $\nu_d$=57.4). In accordance with Formula (2) above, the value of the step difference d obtainable with the working wave length λ set at 500 nm and l at 2, 3 and 4, and the phase difference ((2l−1)/2) obtainable for each wave length from the step difference value d are obtained as shown in Table 1.

Further, for the manufacture of the focusing screen and for effectively obtaining the desired diffusing characteristic, the step difference (height) value d is preferably set within a range from 1.2 to 10 μm.

TABLE 1

| λ | (n − 1)d Phase difference at each wave length | | |
|---|---|---|---|
| | 1.5λ(500) | 2.5λ(500) | 3.5λ(500) |
| 300(nm) | 2.89(λ) | 4.81 | 6.73 |
| 400 | 1.92 | 3.19 | 4.47 |
| 500 | 1.50 | 2.50 | 3.50 |
| 600 | 1.24 | 2.06 | 2.88 |
| 700 | 1.05 | 1.75 | 2.46 |
| d(μm) | 1.51 | 2.52 | 3.52 |

Figure 2:
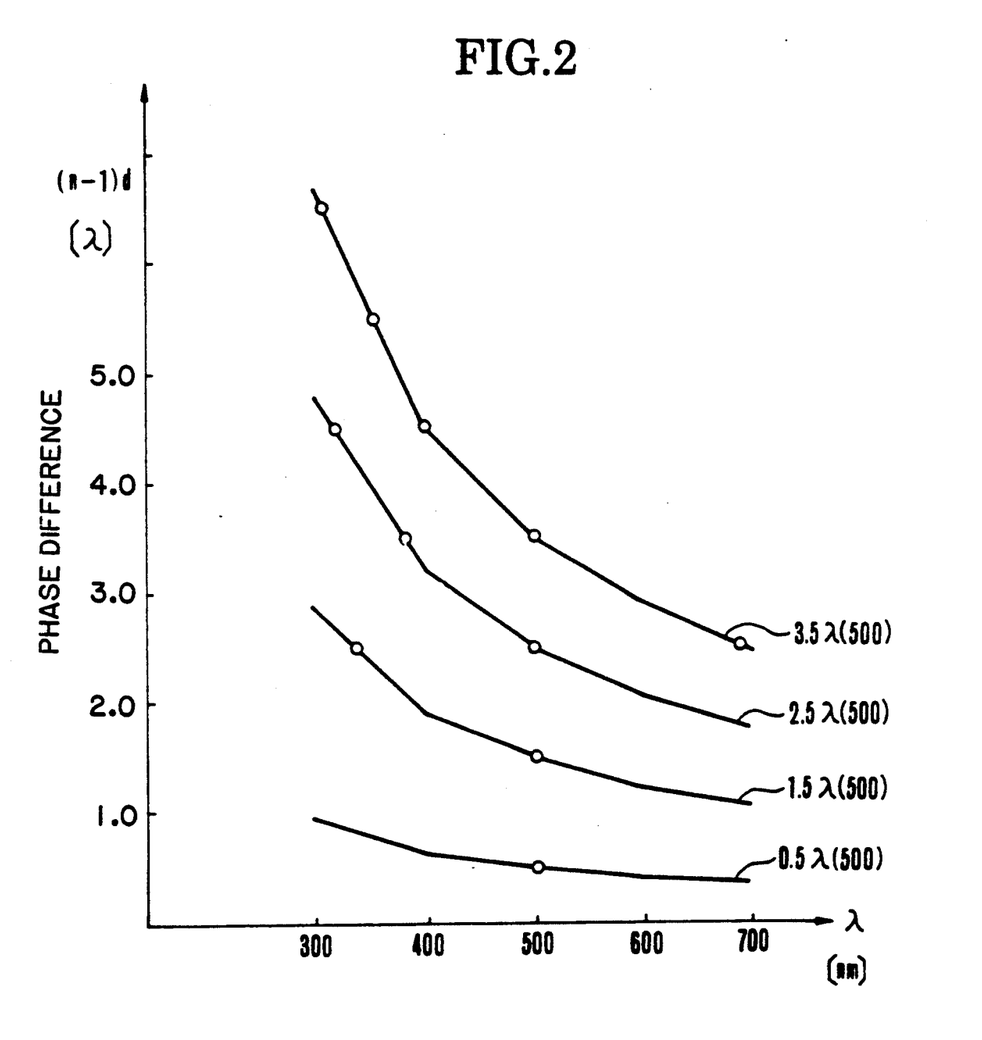
FIG. 2 shows the advantageous effect of a focusing screen arranged as the first embodiment of the invention.

FIG. 2 shows the distribution of the phase difference values obtained at different wave lengths. In this case, the phase difference values (n−1)d are set as follows with wave length λ=500 nm used as a datum: 0.5 λ (500); 1.5 λ (500); 2.5 λ (500); 3.5 λ (500).

In FIG. 2, circle marks indicate parts conforming to Formula (2). Referring to FIG. 2, in the case of this embodiment, the step difference value d, the refractive index n, etc. are set within a region above a line of 1.5 λ (500), i.e., within a region satisfying the condition of (n−1)d>1.5 λ. The embodiment is thus arranged to give the desired diffusing characteristic at a plurality of wavelength values within a range from 300 to 700 nm or thereabout.

As for the method for obtaining protrudent parts (or rises) of the given shape on the base plate, the base plate on which the minute patterns of rises are allocated may be formed together with the rises with a plastic material; or the minute patterns may be applied to the surface of a base plate made of glass or the like by a vapor deposition process.

The base plate and the protrudent parts do not have to be made of one and the same material. They may be made of different materials. However, the use of materials of equal refractive indexes for the base plate and the protrudent parts enables them to have a lower reflection factor at interfaces between them. Therefore, they are preferably made of the same material for a better optical performance.

While the minute patterns of protrudent parts are irregularly formed on the base plate in the case of the first embodiment, the irregular array of protrudent parts or rises may be replaced with an irregular array of recesses. It is also possible either to have these rises and recesses formed in a commingled state or to have them formed in different sizes in a commingled state.

Figure 3:
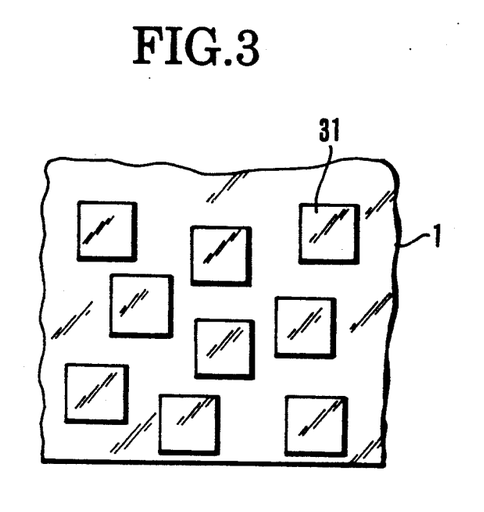
FIGS. 3, 4(A) and 5 are plan views showing second, third and fourth embodiments of the invention.
Figure 4A:
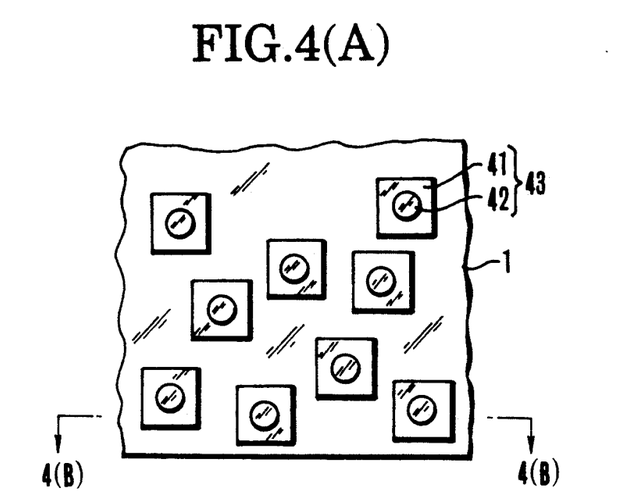
Figure 5:
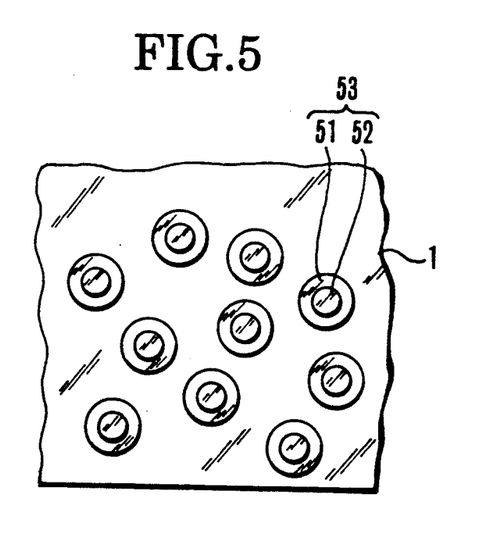

FIGS. 3, 4(A) and 5 are plan views respectively showing second, third and fourth embodiments of this invention. In the case of the second embodiment which is shown in FIG. 3, each of minute patterns 31 of rises or recesses is formed in a square shape.

Figure 4B:
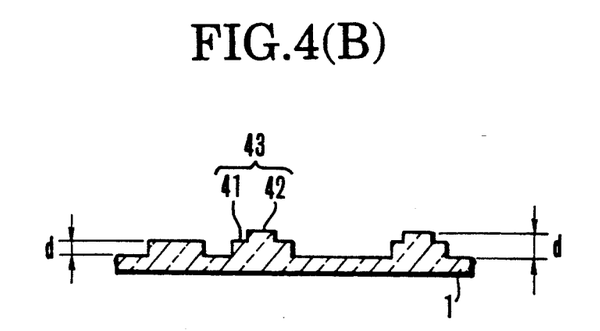
FIG. 4(B) is a sectional view of FIG. 4(A).

In the third embodiment which is shown in FIG. 4(A), minute patterns 43 are formed on a base plate 1 with a square rise 41 and a circular rise 42 jointly forming each of the minute patterns in combination with each other. FIG. 4(B) shows this in a sectional view.

The fourth embodiment which is shown in FIG. 5 has a plurality of minute patterns 53 formed on a base plate 1 with a circular rise 51 and another circular rise 52 which is smaller than the rise 51 arranged to jointly form each of the minute patterns 53.

In accordance with this invention, the minute patterns may be formed in any shapes other than the above-stated shapes, such as polygonal shapes, etc.

In the embodiments shown in FIGS. 4(A) and 5, the step difference value d mentioned in the foregoing corresponds to a distance from the surface of the base plate 1 to the height of the protrudent or recessed parts. Further, the sectional shape of the protrudent or recessed parts is not limited to a rectangular shape but may be a trapezoidal, triangular, or circular shape.

Figure 6A:
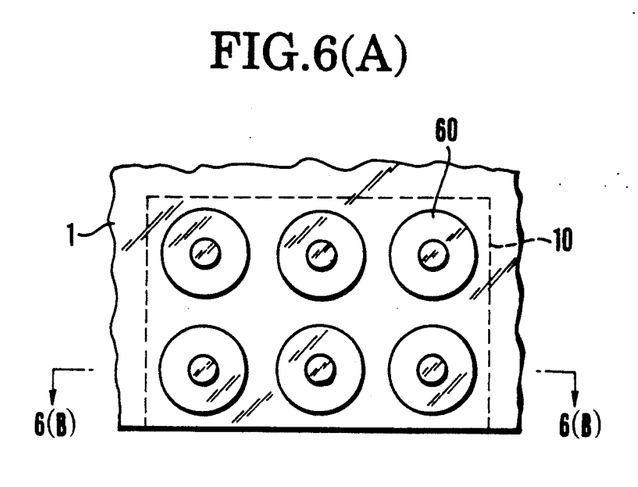
FIGS. 6(A) and 6(B) are a plan view and a sectional view showing a fifth embodiment of the invention.
Figure 6B:
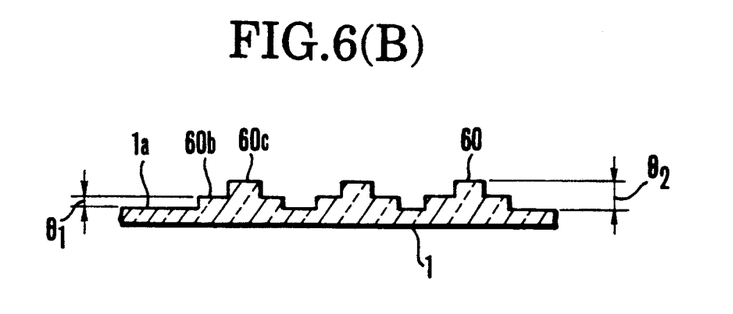

FIG. 6(A) is a plan view showing the unit region of a further embodiment of the invention. FIG. 6(B) is a sectional view of FIG. 6(A).

Referring to FIGS. 6(A) and 6(B), the illustration includes an optically transparent base plate 1; a unit region 10; minute patterns 60 each of which is formed by a circular protrudent part. The minute patterns 60 of the circular protrudent parts are made of the same material as that of the base plate 1.

As shown in FIG. 6(B), each of the protrudent parts consists of two stepped faces 60b and 60c and is formed in three steps as a whole. Each region thus imparts its own phase difference to a passing light flux.

With a phase of the light flux of a given wave length passing through the base plate surface 1a as a reference, and the phase differences between the reference and the phase of light fluxes passing through the two stepped faces 60b and 60c set to be θ1 and θ2 respectively, the embodiment is arranged to satisfy the following condition:

$$\theta_2 > \theta_1 > 0 \qquad (3)$$

A given phase difference is thus imparted to the light flux passing through each of the different faces $1a$, $60b$ and $60c$ in such a way as to have scattering of light brought about by the phase difference which is imparted areawise.

In the case of this embodiment shown in FIG. 6(B), with the working wave length region of light incident on the focusing screen set at about 300 to 700 nm and with an arbitrary wave length assumed to be $\lambda$, the phase differences $\theta_1$ and $\theta_2$ obtained on the basis of the step difference d between the surface $1a$ of the base plate 1 and the stepped faces $60b$ and $60c$ of the protrudent part are thus arranged to satisfy Formula (3).

For obtaining the desired diffusing characteristic by controlling the minute patterns of protrudent parts with the light of the wavelength $\lambda$ allowed to be incident thereon, it is necessary to set the step difference d and the refractive index n of the material of the protrudent parts to satisfy equation (2).

In view of this, the embodiment is arranged to have the size of the circular minute patterns of FIG. 6(A) set between 1 and 7 μm. This arrangement enables the embodiment to easily obtain the desired diffusing characteristic. Further, with an arbitrary wave length $\lambda$ selected from the wavelength range of 300 to 700 nm, the minute patterns are arranged to have the above-stated phase differences $\theta_1$ and $\theta_2$ satisfy the following condition:

$$\theta_2 = 2\theta_1 = m\lambda\lambda(m = 1, 2, 3, \ldots) \qquad (4)$$

Next, with this embodiment arranged to use an acrylic resin material ($n_2 = 1.49171$, $\nu_d = 57.4$) for the base plate 1 and the protrudent parts, to have the working wave length $\lambda = 500$ nm and to have the phase differences of the three different faces $1a$, $60b$ and $60c$ set at 0, $\theta_1 = 1.5\lambda$ and $\theta_2 = 3\lambda$ according to Formula (4) above, the phase difference values at different wave lengths were computed and obtained according to Formula (2) Table 2 shows the results of this computation. Further, in the case of this embodiment, the step difference d is preferably set within a range from 0.2 to 10 μm for facilitating the manufacture thereof and for effectively obtaining the desired diffusing characteristic.

TABLE 2

| | (n − 1)d Phase difference at each wave length | |
|---|---|---|
| $\lambda$ | $\theta_1$ 1.5λ(500) | $\theta_2$ 3.0λ(500) |
| 300(nm) | 2.89(λ) | 5.78 |
| 400 | 1.92 | 3.84 |
| 500 | 1.50 | 3.0 |
| 600 | 1.24 | 2.48 |
| 700 | 1.05 | 2.10 |
| d(μm) | 1.51 | 3.02 |

Figure 7:
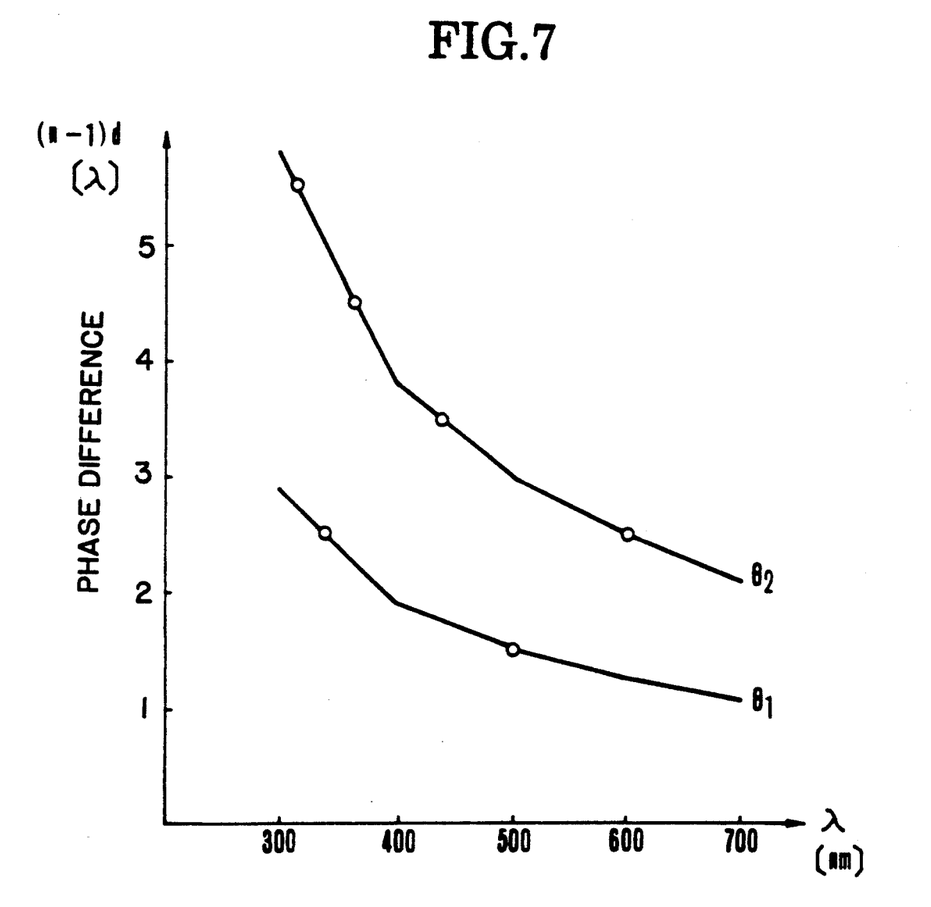
FIG. 7 shows the effect of a focusing screen arranged as the fifth embodiment.

FIG. 7 shows the distribution of the phase difference $(n-1)d$ obtained at different wavelengths shown in Table 2 above. A shown in FIG. 7, the phase difference obtainable at the stepped faces of the embodiment are adequately set as mentioned in the foregoing, so that the desired diffusing characteristic can be attained at a plurality of wave lengths within the wave length range from 300 to 700 nm.

Further, in the case of this embodiment, with the length of one side of the unit region 10 assumed to be S, the unit region 10 is preferably formed in such a polygonal shape as a square or rectangular shape having one side S set at a value within the following range, for facilitating the manufacture of the embodiment and for effectively obtaining the desired diffusing characteristic:

$$30 \ \mu m \leq S \leq 50 \ \mu m \qquad (5)$$

The minute patterns of protrudent parts of the given shape of this embodiment provided on the surface of the base plate may be formed in one unified body with the base plate by a plastic material or may be applied to the surface of a glass base plate or the like by a vapor deposition process.

Further, in the embodiment, the base plate and the protrudent parts do not have to be made of one and the same material. They may be made of different materials. However, in order to reduce the reflection factor of light at an interface between them and to obtain good optical performance, the material of the base plate and that of the protrudent parts are preferably arranged to have equal refractive indexes.

In the case of this embodiment, the minute patterns of protrudent parts are regularly arranged on the surface of the base plate. This arrangement, however, may be changed either to regularly arrange recessed parts in place of the protrudent parts or to have both the protrudent and recessed parts arranged in a commingled state. Further, protrudent and recessed parts of different sizes may be arranged in a commingled state.

Figure 8A:
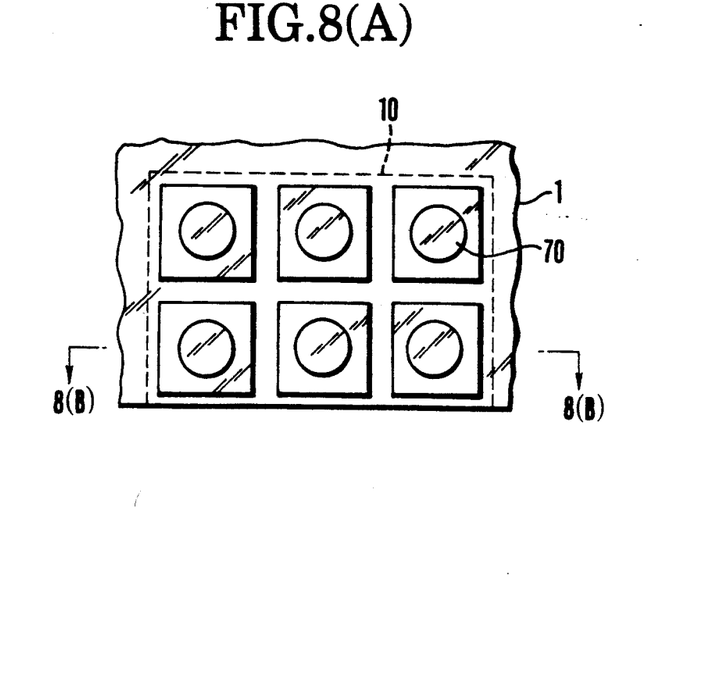
FIGS. 8(A) and 9 are plan views showing sixth and seventh embodiments of the invention.
Figure 9:
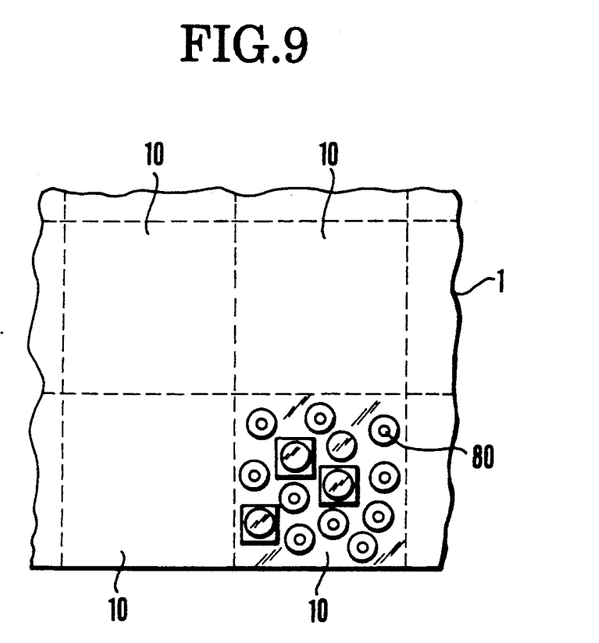

FIGS. 8(A) and 9 are plan views showing further embodiments of this invention.

Figure 8B:
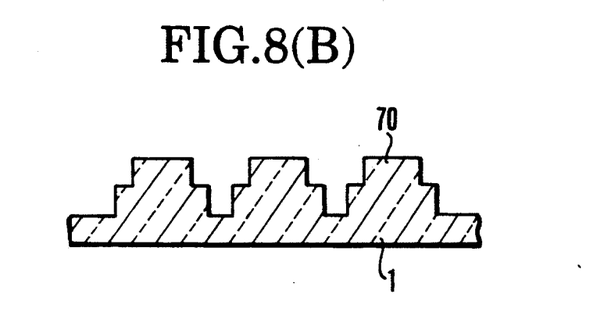
FIG. 8(B) is a sectional view of FIG. 8(A).

In the case of the embodiment shown in FIG. 8(A), minute patterns 70 are formed including square and circular protrudent parts in combination with each other on the surface of the base plate 1. FIG. 8(B) shows this embodiment in a sectional view.

The embodiment which is shown in FIG. 9 is arranged as follows: A plurality of unit regions of a square shape, each side thereof measuring S in length to satisfy Formula (5), are regularly arranged. Within each unit region 10, minute patterns 80 of circular protrudent and/or recessed parts are irregularly arranged to give phase differences in three steps.

In the case of this embodiment, the focusing screen is arranged to minimize any adverse effect of diffraction that results from a periodic arrangement, for the purpose of eliminating, particularly, the possibility of having a chrominance blur in an image obtained by a photo-taking system.

The minute patterns of this embodiment may be formed in any shapes including polygonal shapes.

What is claimed is:

1. A phase type focusing screen comprising an optically transparent base plate and a plurality of minute protrudent and/or recessed parts of a predetermined shape and irregularly allocated on a surface of said base plate, in which assuming that a stepped level difference between the surface of said base plate and a top face of said protrudent part of a bottom face of said recessed part is d, a refractive index of a material of said base plate is n and the shortest wave length within a working wave length region is $\lambda$, the following condition is satisfied:

$$d \geq 1.5\lambda/(n-1).$$

2. A focusing screen according to claim 1, wherein said shortest wave length is 300 nm.

3. A focusing screen according to claim 1, further satisfying the following condition:

$$(n-1)d = \left(\frac{2l-1}{2}\right)\lambda \ (l = 2, 3, 4, \ldots).$$

4. A focusing screen according to claim 1, wherein said working wave length region is from 300 to 700 nm.

5. A phase type focusing screen comprising an optically transparent base plate and a plurality of minute protrudent and/or recessed parts of a circular shape and allocated on a surface of said base plate, at least a plurality of said protrudent and/or recessed part comprising first and second stepped levels which are different distances above or below the surface of said base plate, in which assuming that phase differences between light fluxes passing through the surface of the base plate and light fluxes passing through said first and second stepped levels are $\theta 1$ and $\theta 2$, respectively, the following condition is satisfied:

$$\theta 2 > \theta 1 > 0$$

6. A focusing screen according to claim 5, wherein said plurality of minute protrudent and/or recessed parts are formed so that, with an arbitrary wave length within a wave length region from 300 to 700 nm assumed to be $\lambda$, said phase differences $\theta 1$ and $\theta 2$ satisfy the following conditions:

$$\theta 2 = 2 \theta 1 = m\lambda \ (m = 1, 2, \ldots).$$

7. A phase type focusing screen according to claim 5, wherein said focusing screen further comprises a plurality of protrudent and/or recessed parts of a square shape.

8. A phase type focusing screen according to claim 5, wherein said protrudent and/or recessed parts are irregularly distributed.

9. A phase type focusing screen, comprising:
an optically transparent base plate; and
a plurality of protrudent and/or recessed parts irregularly allocated in a unit region on said base plate, a plurality of said unit regions being regularly distributed on said base plate, each said protrudent and/or recessed part having a flat surface; said protrudent and/or recessed parts being disposed in at least two different step levels which are respectively disposed at two different distances from a level of said base plate.

10. A phase type focusing screen according to claim 9, wherein said protrudent and/or recessed parts are circular in shape.

* * * * *

UNITED STATES PATENT AND TRADEMARK OFFICE
CERTIFICATE OF CORRECTION

PATENT NO. : 5,161,058
DATED : November 3, 1992
INVENTOR(S) : MATSUI

It is certified that error appears in the above-identified patent and that said Letters Patent is hereby corrected as shown below:

COLUMN 1

Line 18, "hereto" should read --heretofore--.
Line 45, "vertical" should read --virtual--.

COLUMN 3

Formula 2, "(1 = 2, 3, 4,...5,)" should read --(1 = 2, 3, 4, 5,...)--.

Table 1, "wave length" should read --wavelength--.

COLUMN 5

Form 4, "$m\lambda\lambda$" should read --$m\lambda$--.

COLUMN 7

Line 16, "part" should read --parts--.

Signed and Sealed this

Ninth Day of November, 1993

Attest:

BRUCE LEHMAN

*Attesting Officer*  *Commissioner of Patents and Trademarks*